(12) United States Patent
McGee et al.

(10) Patent No.: US 6,841,619 B2
(45) Date of Patent: *Jan. 11, 2005

(54) COMPOUND AND COATING COMPOSITIONS FOR ADHESION TO OLEFINIC SUBSTRATES

(75) Inventors: John D. McGee, Highland, MI (US); Daniel Blickberndt, Norwalde (DE); Craig Schang, Madison Heights, MI (US); Walter H. Ohrbom, Hartland Township, MI (US); Keri Krueger, Livonia, MI (US)

(73) Assignee: BASF Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/907,207

(22) Filed: Jul. 17, 2001

(65) Prior Publication Data
US 2002/0010268 A1 Jan. 24, 2002

Related U.S. Application Data

(62) Division of application No. 09/143,156, filed on Aug. 28, 1998, now Pat. No. 6,300,414.

(51) Int. Cl.$^7$ .............. C08J 3/00; C08K 3/04; C08L 53/00; C08L 67/02; B32B 31/20
(52) U.S. Cl. .............. 525/165; 156/309.6; 427/372.2; 427/385.5; 428/515; 428/516; 428/517; 524/496; 524/505; 525/92 F; 525/92; 525/90
(58) Field of Search .............. 525/92 F, 92, 525/165, 90; 524/496, 505; 156/309.6; 427/372.2, 385.5; 428/515, 516, 517

(56) References Cited

U.S. PATENT DOCUMENTS

| | | | |
|---|---|---|---|
| 3,666,701 A | 5/1972 | Marrs .................. | 260/27 |
| 4,717,711 A | 1/1988 | Vanier et al. | |
| 4,874,818 A | 10/1989 | Yamamoto et al. | |
| 4,898,965 A | 2/1990 | Kinoshita et al. ...... | 558/416 |
| 5,106,446 A | 4/1992 | Beck et al. | |
| 5,458,933 A | 10/1995 | Suskind | |
| 5,488,455 A | 1/1996 | Cahill et al. | |
| 5,500,163 A | 3/1996 | Ponnet | |
| 5,512,333 A | 4/1996 | Suskind | |
| 5,536,544 A | 7/1996 | Liegeois | |
| 5,597,864 A | 1/1997 | Leiss | |
| 5,667,856 A | 9/1997 | Kamen et al. | |
| 5,830,578 A | 11/1998 | Ono et al. | |
| 5,853,898 A | 12/1998 | Obara et al. | |
| 6,423,778 B1 * | 7/2002 | McGee et al. | |

FOREIGN PATENT DOCUMENTS

| | | | |
|---|---|---|---|
| DE | 42 11 412 A1 | 4/1992 | .......... C08L/25/08 |
| GB | 2 125 803 | 8/1983 | .......... C08L/93/04 |
| JP | 3 60113 | 3/1991 | .......... H01L/21/30 |
| JP | 3-65829 | 3/1991 | .......... H04B/7/26 |
| JP | 4-25454 | 1/1992 | .......... B32B/27/30 |
| JP | 4-38777 | 4/1992 | .......... G11B/21/10 |
| JP | 6065467 | 3/1994 | |
| JP | 7-223297 | 8/1995 | .......... B32B/27/28 |
| JP | 8-81616 | 3/1996 | .......... C08L/63/00 |
| JP | 8-207569 | 8/1996 | .......... B60J/3/04 |
| JP | 2627839 | 4/1997 | .......... C09J/175/04 |
| JP | 10-110024 | 4/1998 | .......... C08G/18/62 |
| WO | WO 94/16027 | 7/1994 | .......... C09J/201/00 |
| WO | WO 98/03334 | 1/1998 | .......... B32B/27/36 |
| WO | WO 98/15601 | 4/1998 | .......... C09J/5/00 |

* cited by examiner

Primary Examiner—Patrick D. Niland

(57) ABSTRACT

The present invention provides an olefin-based block copolymer that has an olefin block that is substantially saturated and at least one (poly)ester or (poly)ether block. The olefin-based block copolymer of the invention can be prepared by reacting a liquid hydroxyl-functional, saturated or substantially saturated olefin polymer with a chain-extension reagent that is reactive with hydroxyl groups and will polymerize in a head-to-tail arrangement of monomer units. The olefin-based block copolymer of the invention can be used to prepare an adhesion promoter that provides excellent adhesion of subsequent coating layers to olefinic substrates like TPO and superior properties as compared to previously used adhesion promoters containing chlorinated polyolefins. Alternatively, the olefin-based copolymers of the invention can be used as an additive in a curable coating composition to provide excellent adhesion to olefinic substrates like TPO, even when used in very minor amounts compared to the amounts required for previously known agents.

30 Claims, No Drawings

COMPOUND AND COATING COMPOSITIONS FOR ADHESION TO OLEFINIC SUBSTRATES

CROSS-REFERENCE TO RELATED APPLICATION

The present application is a divisional application of U.S. Ser. No. 09/143,156, filed on Aug. 28, 1998 now U.S. Pat. No. 6,300,414, which is incorporated herein by reference.

FIELD OF THE INVENTION

This invention concerns curable coating compositions, especially compositions that are applied over olefinic substrates, particularly thermoplastic polyolefin (TPO) substrates.

BACKGROUND OF THE INVENTION

It is often desirable, for decorative or functional reasons, to apply a coating over a plastic substrate. For certain substrates it has been difficult to find coating compositions that provide the required adhesion at a reasonable price and with suitable physical properties. It is well-known that it is difficult to obtain good adhesion of paints to olefinic substrates, including thermoplastic polyolefin (TPO) substrates and other such modified polyolefin-based materials.

In addition to painted articles, TPO has been used in a color-in-mold process to produce articles of the desired colored that are not intended to be painted, so long as the requirements for appearance are not stringent. The color-in-mold process, however, is not adequate for producing high class ("class 1") surfaces for a number of reasons. First, it is difficult to achieve high gloss finishes, and difficult to control the gloss of the finish reproducibly from one article to the next. Secondly, TPO is relatively soft and it would desirable to coat the substrate with a coating composition that can offer resistance to marring and scratching. Finally, uncoated or unpainted TPO may have unsatisfactory weathering properties (i.e., may degrade, discolor, or chalk during outdoor exposure) in certain applications, whereas it is known that coatings provide good weathering characteristics to many different substrates. For these reasons, then, it would be desirable to have a means of applying a coating composition to an olefinic substrate to provide the properties lacking in the uncoated (raw) uncolored or colored substrate.

Plastic substrates may be coated with curable, or thermosettable, coating compositions. Thermosettable coating compositions are widely used in the coatings art, particularly for high-performance primers and topcoats. Color-plus-clear composite coatings have been particularly useful as topcoats for which exceptional gloss, depth of color, distinctness of image, or special metallic effects are desired.

In the past, it has been necessary to include one or more additional separate manufacturing steps to prepare an olefinic substrate for painting so that the coating layer will be able to adhere to the olefinic substrate. According to one frequently used method, a thin layer of an adhesion promoter or tie layer is applied directly to the olefinic substrate. The desired coating layer or layers are then applied over the adhesion promoter. Such adhesion promoters typically include a chlorinated polyolefin. Adhesion promoters with chlorinated polyolefins are expensive to use, often exhibit instability, and, if used in a clear (unpigmented) composition, produce colored, hazy films. In addition, the chlorinated polyolefin materials may produce coatings with poor exterior durability because they are susceptible to degradation when exposed to UV light. Another method that has been used to prepare an olefinic substrate to receive a coating layer is chemical modification of the substrate surface, for example by flame or corona pretreatment.

Recently, coating compositions that include significant concentrations of adhesion promoting agents in order to achieve good adhesion to olefinic substrates have been proposed. Published international application WO 97/35937 describes a composition that includes 5–45% by weight of resin solids of a substantially saturated polyhdroxylated polydiene polymer having terminal hydroxyl groups. International Publication Number WO 97/35937 and all of the references cited therein are hereby incorporated herein by reference. The international publication '937 discloses that such polymers are the hydrogenated product of dihydroxy polybutadiene produced by anionic polymerization of conjugated diene hydrocarbon capped with two moles of ethylene oxide and terminated with two moles of methanol. (The ethylene oxide produces the oxygenated anion, and the methanol provides the hydrogen cation to form the hydroxyl group.) The large amount of this adhesion promoting agent that must be included may adversely affect physical properties and appearance of the resulting coating. In addition, compositions that include significant concentrations of the adhesion promoting agent may separate into phases because the different components frequently are not very compatible. The '937 reference requires a specific solvent package that may be undesirable in many instances. The same problems are encountered with other prior art adhesion promoting agents such as chlorinated polyolefins. It is also known that including chlorinated polyolefins in some coating compositions, e.g., curable coating compositions that include acid catalysts, can result in adverse interactions between the different components of the coating composition.

It is an object of the present invention to provide a material that can be used to prepare an adhesion promoter or used as an adhesion promoting agent or additive in a coating composition to provide excellent adhesion to uncoated olefinic substrates while overcoming the drawbacks of the compositions and methods previously used.

SUMMARY OF THE INVENTION

The present invention provides an olefin-based block copolymer that has an olefin block and at least one (poly) ester or (poly)ether block. By the terms "(poly)ester block" and "(poly)ether block" it is meant that the base polyolefin material is modified with one or more one monomer units through formation of, respectively, ester or ether linkages. For purposed of the present invention, "(poly)ester block" has a special meaning that, in the case of two or more monomer units, the monomer units are predominantly, preferably exclusively, arranged in head-to-tail linkages. Thus, the arrangement of the ester linkages in the (poly)ester block or blocks may be represented by

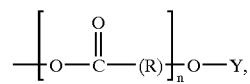

in which n represents the number of monomer units, R represents the part of each monomer unit between the ester groups (which may be all the same if only one type of monomer is used or different for individual units if a mixture of different monomers is used), and Y represents the end-group of the block. The monomer units should be arranged exclusively in the head-to-tail arrangement, although it is possible, particularly in longer blocks, for there to be some variation; in the latter case, the arrangement should still be predominantly head-to-tail. Preferred embodiments for n, R, and Y are described below.

The olefin-based block copolymer of the invention can be prepared by reacting a liquid hydroxyl-functional, saturated or substantially saturated olefin polymer with a chain-extension reagent that is reactive with hydroxyl groups and will polymerize in a head-to-tail arrangement of monomer units. Such chain-extension reagents include, without limitation, lactones, hydroxy carboxylic acids, oxirane-functional materials such as alkylene oxides, and combinations of these. Preferred chain-extension reagents are lactones and alkylene oxides, and even more preferred are epsilon caprolactone, ethylene oxide, and propylene oxide.

The olefin-based block copolymer of the invention can be used to prepare an adhesion promoter that provides excellent adhesion of subsequent coating layers to olefinic substrates like TPO at a much lower cost than the previously used adhesion promoters containing chlorinated polyolefins. Alternatively, the olefin-based copolymers of the invention can be used as an additive in a curable coating composition to provide excellent adhesion to olefinic substrates like TPO, even when used in very minor amounts compared to the amounts required for previously known agents. The adhesion promoter or coating composition of the invention is applied directly to an unmodified plastic substrate, in other words to a plastic substrate that has no flame or corona pretreatment or any other treatment meant to chemically modify the surface of the substrate and to which no previous adhesion promoter or coating has been applied.

When used as an additive, the olefin-based block copolymer of the invention may be added to a variety of coating compositions to provide good adhesion to TPO and other olefinic substrates, even at relatively low levels of the olefin-based block copolymer. Compositions of the invention include primers, one-layer topcoats, basecoats, and clearcoats. In one preferred method according to the invention, a clearcoat composition containing the olefin-based block copolymer is applied over a colored TPO substrate.

Coating compositions according to the invention that include the block copolymer additive can be formulated to provide gloss over a wide range of values suited to particular applications. In addition, the compositions of the invention can impart desirable surface properties to the TPO or olefinic articles, such as resistance to scratching and marring, as well as enhance the weathering durability of such articles.

DETAILED DESCRIPTION

The olefin-based block copolymer of the invention has at least one block that is a (poly)ester or (poly)ether block and at least one block is an olefin material. Preferably, the block copolymer has one block of the olefin material to which is attached one or more of the (poly)ester and/or (poly)ether blocks. In one embodiment, the olefin-based block copolymer of the invention can be represented by a structure

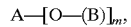

in which A represents an olefin block, B represents a (poly)ester or (poly)ether block or combinations thereof, and m is on average from about 0.7 to about 10, preferably from about 1.7 to about 2.2, and particularly preferably about 1.9 or 2. The A block is a saturated or substantially saturated olefin polymer. The B block preferably contains, on average, from about 0.5 to about 25 monomer units, more preferably the B block has on average from about 2 to about 10, and even more preferably from about 2 to about 6, monomer units per hydroxyl group of the unmodified olefin block. The monomer units may be the same or there may be different monomer units in a single (poly)ester or (poly)ether block. For example, a (poly)ether block may have one or more ethylene oxide units and one or more propylene oxide units.

The olefin-based block copolymer of the invention can be prepared by reacting a hydroxyl-functional olefin polymer with a chain-extension reagent that is reactive with hydroxyl groups and will polymerize in a head-to-tail arrangement of monomer units. The hydroxyl-functional olefin forms the A block, which the chain-extension reagent forms the B block or blocks. Such chain-extension reagents include, without limitation, lactones, hydroxy carboxylic acids, oxirane-functional materials such as alkylene oxides, and combinations of these. Preferred chain-extension reagents are lactones and alkylene oxides, and even more preferred are epsilon caprolactone, ethylene oxide, propylene oxide, and combinations of these.

The hydroxyl-functional olefin polymer may be produced by hydrogenation of a polyhydroxylated polydiene polymer. Polyhydroxylated polydiene polymers may produced by anionic polymerization of monomers such as isoprene or butadiene and capping the polymerization product with alkylene oxide and methanol, as described in U.S. Pat. Nos. 5,486,570, 5,376,745, 4,039,593, and Reissue 27,145, each of which is incorporated herein by reference. The polyhydroxylated polydiene polymer is substantially saturated by hydrogenation of the double bonds that is at least 90 percent, preferably at least 95% and even more preferably essentially 100% complete to form the hydroxyl-functional olefin polymer. The hydroxyl equivalent weight of the hydroxyl-functional saturated olefin polymer may be from about 500 to about 20,000. The hydroxyl-functional olefin polymer is preferably a hydroxyl-functional ethylene/butylene polymer. Preferred olefin polymers may have a number average molecular weight of from about 2000 to about 10,000. Preferably, the olefin polymer is a liquid poly(ethylene/butylene) polymer having at least one hydroxyl group. Preferably, the olefin polymer has from about 0.7 to about 10 hydroxyl groups on average per molecule, more preferably from about 1.7 to about 2.2 hydroxyl groups on average per molecule, and still more preferably about 2 hydroxyl groups on average per molecule. The hydroxyl-functional olefin polymer preferably has terminal hydroxyl groups and a hydroxyl equivalent weight of from about 1000 to about 3000.

Such materials are commercially available from Shell Chemical Company, Houston, Tex., under the tradename KRATON LIQUID. One preferred material is KRATON LIQUID L-2203, an anionically polymerized, polymeric diol containing terminal primary hydroxyl groups, that is available from Shell Chemicals. Anionic polymerization results in polymers having a very narrow molecular weight distribution. Molecular weight distributions of less than about 1.2, particularly about 1.1 or less, are preferred for these materials.

While not wishing to be bound by theory, it is believed that the mechanism that results in adhesion of the coating to the substrate involves a migration of the olefin-based block copolymer to the olefinic or TPO substrate interface and an interaction with the olefinic or TPO substrate. It is believed that the migration and/or interaction is facilitated by application of heat, such as the heat applied to cure the coating composition. It is also believed that the migration and/or interaction is facilitated by predominantly lower molecular weight molecules. Olefin-based block copolymers having narrower polydispersity (i.e., closer to the ideal of 1), in which high molecular weight fractions are less than for materials having similar number average molecular weights but broader (higher) polydispersity, are believed to offer an advantage in either better adhesion at lower levels of incorporation or effective adhesion achieved under milder conditions (lower temperatures and/or shorter interaction times). "Polydispersity," also known simply as "dispersity," is defined in polymer science as the ratio of the weight average molecular weight to the number average molecular weight. Higher polydispersity numbers indicate a broader distribution of molecular weights, and in particular mean a larger fraction of higher molecular weight species.

The olefin-based block copolymer of the invention thus preferably has a narrow polydispersity. When the liquid olefin polymer is anionically polymerized it may have a very narrow polydispersity, such as on the order of only about 1.1. The ring-opening reactions of lactones and alkylene oxides or reactions of other materials that add head-to-tail like the hydroxy carboxylic acids tend to produce polymers that are more uniform and have narrow polydispersities. Modification of the olefin polymer by a head-to-tail reaction such as a ring-opening reaction of a lactone or alkylene oxide compound usually results in a product having a polydispersity of about 1.1 or 1.15, thus essentially preserving the narrow polydispersity of the hydroxyl-functional olefin starting material. Block copolymers of the invention preferably have polydispersities of about 1.2 or less, and more preferably have polydispersities of about 1.15 or less.

Again while not wishing to be bound by theory, it is believed that the modification of the liquid olefin polymer by the (poly)ester or (poly)ether block or blocks offers significant advantages in providing adhesion of coatings to olefinic substrates because of increased compatibility of the resulting block copolymer toward materials commonly employed in such coatings. In addition, the imposition of the (poly)ester or (poly)ether block between the olefin block and the functional group, such as the hydroxyl group, makes that functional group more accessible for reaction during the curing of the coating composition. These principles can be used to optimize the olefin-based block copolymer of the invention for use under particular conditions or with or in particular coating compositions.

In a preferred embodiment, the olefin polymer is reacted with a lactone or a hydroxy carboxylic acid to form an olefin-based polymer having (poly)ester end blocks. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Lactones useful in the practice of the invention can also be characterized by the formula:

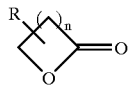

wherein n is a positive integer of 1 to 7 and R is one or more H atoms, or substituted or unsubstituted alkyl groups of 1–7 carbon atoms.

The lactone ring-opening reaction is typically conducted under elevated temperature (e.g., 80–150° C.). When the reactants are liquids a solvent is not necessary. However, a solvent may be useful in promoting good conditions for the reaction even when the reactants are liquid. Any non-reactive solvent may be used, including both polar and nonpolar organic solvents. Examples of useful solvents include, without limitation, toluene, xylene, methyl ethyl ketone, methyl isobutyl ketone, and the like and combinations of such solvents. A catalyst is preferably present. Useful catalysts include, without limitation, proton acids (e.g., octanoic acid, Amberlyst® 15 (Rohm & Haas)), and tin catalysts (e.g., stannous octoate). Alternatively, the reaction can be initiated by forming a sodium salt of the hydroxyl group on the molecules that will react with the lactone ring.

A hydroxy carboxylic acid can also be used instead of a lactone or in combination with a lactone as the compound that reacts with the liquid olefin polymer to provide ester blocks. Useful hydroxy carboxylic acids include, without limitation, dimethylhydroxypropionic acid, hydroxy stearic acid, tartaric acid, lactic acid, 2-hydroxyethyl benzoic acid, N-(2-hydroxyethyl)ethylene diamine triacetic acid, and combinations of these. The reaction can be conducted under typical esterification conditions, for example at temperatures from room temperature up to about 150° C., and with catalysts such as, for example, calcium octoate, metal hydroxides like potassium hydroxide, Group I or Group II metals such as sodium or lithium, metal carbonates such as potassium carbonate or magnesium carbonate (which may be enhanced by use in combination with crown ethers), organometallic oxides and esters such as dibutyl tin oxide, stannous octoate, and calcium octoate, metal alkoxides such as sodium methoxide and aluminum tripropoxide, protic acids like sulfuric acid, or $Ph_4SbI$. The reaction may also be conducted at room temperature with a polymer-supported catalyst such as Amerlyst-15® (available from Rohm & Haas) as described by R. Anand in *Synthetic Communications*, 24(19), 2743–47 (1994), the disclosure of which is incorporated herein by reference.

While polyester segments may likewise be produced with dihydroxy and dicarboxylic acid compounds, it is preferred to avoid such compounds because of the tendency of reactions involving these compounds to increase the polydispersity of the resulting block copolymer. If used, these compounds should be used in limited amounts and preferably employed only after the lactone or hydroxy carboxylic acid reactants have fully reacted.

The reaction with the lactone or hydroxy carboxylic acid or oxirane compounds adds at least one monomer unit as the B block and preferably provides chain extension of the olefin polymer. In particular, the (poly)ester and/or (poly)ether block is thought to affect the polarity and effective reactivity of the end group functionality during curing of the coating. The (poly)ester and/or (poly)ether block also makes the olefin-based block copolymer more compatible with components of a typical curable coating composition. The amount of the extension depends upon the moles of the alkylene oxide, lactone, and/or hydroxy carboxylic acid available for reaction. The relative amounts of the olefin polymer and the alkylene oxide, lactone, and/or hydroxy acid can be varied to control the degree of chain extension. The reaction of the lactone ring, oxirane ring, and/or hydroxy carboxylic acid with a hydroxyl group results in the formation of an ether or ester and a new resulting hydroxyl group that can then react with another available monomer, thus providing the desired chain extension. In the preferred embodiments of the present invention, the equivalents of oxirane, lactone, and/or hydroxy carboxylic acid for each equivalent of hydroxyl on the olefin polymer are from about 0.5 to about 25, more preferably from about 1 to about 10, and even more preferably from about 2 to about 6. In an especially preferred embodiment about 2.5 equivalents of lactone are reacted for each equivalent of hydroxyl on the olefin polymer.

In another embodiment of the invention, a polyolefin having terminal hydroxyl groups is reacted with an oxirane-containing compound to produce (poly)ether endblocks. The oxirane-containing compound is preferably an alkylene oxide or cyclic ether, especially preferably a compound selected from ethylene oxide, propylene oxide, butylene oxide, tetrahydrofuran, and combinations of these. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The hydroxyl group of the olefin-based polymer functions as initiator for the base-catalyzed alkylene oxide polymerization. The polymerization may be carried out, for example, by charging the hydroxyl-terminated olefin polymer and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition.

Tetrahydrofuran polymerizes under known conditions to form repeating units

Tetrahydrofuran is polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of the olefin polymer.

It is also highly desirable for the olefin-based block copolymer of the invention to have functional groups that are reactive with one or more film-forming components of the adhesion promoter, or of the coating composition applied over an adhesion promoter containing the olefin-based block copolymer, or of the coating composition to which the olefin-based block copolymer is added. The film-forming components with which the olefin-based block copolymer may be reactive may be a film-forming polymer or a curing agent. The reactive functional groups on the olefin-based block copolymer may include, without limitation, hydroxyl, carbamate, urea, carboxylic acid, and combinations of these. Following addition of the ether or ester blocks, the block copolymer of the invention has one or more hydroxyl groups, which may be reactive with the film-forming polymer or curing agent. If desired, the hydroxyl groups may be converted to other functional groups, including carbamate, urea, carboxylic acid groups and combinations of these. Carbamate groups according to the invention can be represented by the structure

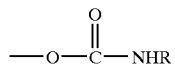

in which R is H or alkyl, preferably of 1 to 4 carbon atoms. Preferably R is H or methyl, and more preferably R is H.

Urea groups according to the invention can be represented by the structure

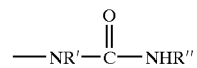

in which R' and R" are each independently H or alkyl, or R' and R" together form a heterocyclic ring structure. Preferably, R' and R" are each independently H or alkyl of from 1 to about 4 carbon atoms or together form an ethylene bridge, and more preferably R' and R" are each independently H. Hydroxyl groups can be converted to carbamate groups by reaction with a monoisocyanate (e.g., methyl isocyanate) to form a secondary carbamate group (that is, a carbamate of the structure above in which R is alkyl) or with cyanic acid (which may be formed in situ by thermal decomposition of urea) to form a primary carbamate group (i.e., R in the above formula is H). This reaction preferably occurs in the presence of a catalyst as is known in the art. A hydroxyl group can also be reacted with phosgene and then ammonia to form a primary carbamate group, or by reaction of the hydroxyl with phosgene and then a primary amine to form a compound having secondary carbamate groups. Finally, carbamates can be prepared by a transesterification approach where hydroxyl group is reacted with an alkyl carbamate (e.g., methyl carbamate, ethyl carbamate, butyl carbamate) to form a primary carbamate group-containing compound. This reaction is performed at elevated temperatures, preferably in the presence of a catalyst such as an organometallic catalyst (e.g., dibutyltin dilaurate). A hydroxyl group can be conveniently converted to a carboxylic acid by reaction with the anhydride of a dicarboxylic acid. It is possible and may be desirable to derivatize the hydroxyl functional olefin-based block copolymer to have other functional groups other than those mentioned, depending upon the particular coating composition in which the olefin-based block copolymer is to interact.

As previously mentioned, the olefin-based block copolymer of the invention can be used to prepare an adhesion promoter for olefinic substrates like TPO that provides excellent adhesion of subsequent coating layers to the substrates. Alternatively, the olefin-based copolymers of the invention can be used as an additive in a curable coating composition to provide excellent adhesion to olefinic substrates like TPO. The adhesion promoter or coating composition of the invention is applied directly to an unmodified and untreated plastic substrate.

First, the olefin-based block copolymer can be used in an adhesion promoter. The olefin-based block copolymer can be used alone as an adhesion promoter layer, particularly when it is of a sufficiently low viscosity to flow out to form a substantially continuous layer on the substrate. In most cases, however, it will be desirable to combine the olefin-based block copolymer with other components, including for example and without limitation crosslinking agents reactive with the functionality on the olefin-based block copolymer, solvents including water and organic solvents, pigments, customary coatings additives, and combinations of these.

In one preferred embodiment, the adhesion promoter is a solution or dispersion that includes only the olefin-based block copolymer as the vehicle. In this embodiment, it is preferred to first apply the adhesion promoter directly to the plastic substrate and then to apply a layer of a coating composition that includes one or more components reactive with the olefin-based block copolymer of the adhesion promoter layer. Applying coating layers "wet-on-wet" is well known in the art.

In an alternative embodiment, the adhesion promoter includes, in addition to the olefin-based block copolymer, at least one crosslinking agent reactive with the block copolymer. The curing agent has, on average, at least about two crosslinking functional groups. Suitable curing agents for active-hydrogen functional olefin-based copolymers include, without limitation, materials having active methylol or methylalkoxy groups, such as aminoplast crosslinking agents or phenol/formaldehyde adducts, curing agents that have isocyanate groups, particularly blocked isocyanate curing agents; and combinations of these. Examples of preferred curing agent compounds include melamine formaldehyde resins (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), polysiloxanes (e.g., trimethoxy siloxane), and combinations of these. Unblocked polyisocyanate curing agents are usually formulated in two-package (2K) compositions, in which the curing agent and the film-forming polymer (in this cased the block copolymer) are mixed only shortly before application and because the mixture has a relatively short pot life. The curing agent may be combinations of these, particularly combinations that include aminoplast crosslinking agents. Aminoplast resins such as melamine formaldehyde resins or urea formaldehyde resins are especially preferred. For this embodiment of the adhesion promoter, the applied adhesion promoter may be either coated "wet-on-wet" with a one or more additional coating compositions, and then all layers cured together, or the adhesion promoter layer may be partially or fully cured before being coated with any additional coating layers. Curing the adhesion promoter layer before applying an additional coating layer may allow the subsequent coating layer to be applied electrostatically when the adhesion promoter is formulated with a conductive carbon black, according to methods known in the art.

Secondly, the olefin-based block copolymer can be added to a variety of coating compositions to produce coating compositions that have excellent adhesion to plastic substrates, particularly to olefinic substrates including TPO. Compositions in which the olefin-based block copolymer may be used include primers, one-layer topcoats, basecoats, and clearcoats. The coating composition having the added block copolymer of the invention can then be applied directly to an uncoated and unmodified olefin-based substrate or other plastic to form a coating layer having excellent adhesion to the substrate. In the case of adding the block copolymer to a basecoat or one-layer topcoat composition, the use of an adhesion promoter or primer layer can be avoided. When the olefin-based block copolymer of the invention is added to a clearcoat composition, the clearcoat can be applied directly to a colored polyolefin substrate, particularly a colored TPO substrate, also known as color-in-mold. This method produces a colored part having better appearance, exterior durability, scratch resistance, and mar resistance as compared to the relatively soft uncoated TPO substrate.

The compositions of the invention preferably include at least about 0.001% by weight of the liquid olefin-based block copolymer, based upon the total weight of nonvolatile vehicle. In one preferred embodiment, the olefin-based block copolymer of the invention is included in the coating composition in an amount of from about 0.001% to about 4% by weight of the total weight of nonvolatile vehicle. In another preferred embodiment, the olefin-based block copolymer of the invention is included in the coating composition in an amount of from about 0.1% to about 10% by weight of the total weight of nonvolatile vehicle, more preferably from about 0.2% to about 5% by weight of the nonvolatile vehicle, and still more preferably from about 0.2% to about 3% of the nonvolatile vehicle of the coating composition. Vehicle is understood to be the resinous and polymer components of the coating composition, which includes film forming resins and polymers, crosslinkers, other reactive components such as the block copolymer of the invention, and other reactive or nonreactive resinous or polymeric components such as acrylic microgels.

The coating compositions of the invention may contain a wide variety of film-forming resins. At least one crosslinkable resin is included. The resin may be self-crosslinking, but typically a coating composition includes one or more crosslinking agents reactive with the functional groups on the film-forming resin. Film-forming resins for coating compositions typically have such functional groups as, for example, without limitiation, hydroxyl, carboxyl, carbamate, urea, epoxide (oxirane), primary or secondary amine, amido, thiol, silane, and so on and combinations of these. The film-forming resin may be any of those used in coating compositions including, without limitation, acrylic polymers, vinyl polymers, polyurethanes, polyesters, polyethers, epoxies, and combinations and graft copolymers of these. Also included are polymers in which one kind of polymer is used as a monomer in forming another, such as a polyester-polyurethane or a polyether-polyurethane in which a dihydroxy functional polyester or polyether is used as a monomer in the urethane polymerization reaction. One preferred film-forming resin is a hydroxy-functional acrylic resin. Many references describe film-forming polymers for curable coating compositions and so these materials do not need to be described in further detail here.

When the coating composition includes a curing agent, or crosslinker, the crosslinker is preferably reactive with both the olefin-based block copolymer and the polymeric film-forming resin. The curing agent has, on average, at least about two crosslinking functional groups, and is preferably one of the crosslinking materials already described above. Aminoplast resins such as melamine formaldehyde resins or urea formaldehyde resins are especially preferred for resin functional groups that are hydroxyl, carbamate, and/or urea. The coating compositions of the invention can be formulated as either one-component (one-package or 1K) or two-component (two-package or 2K) compositions, as is known in the art.

The adhesion promoter or coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

A solvent may optionally be included in the adhesion promoter or coating composition used in the practice of the present invention, and preferably at least one solvent is included. In general, the solvent can be any organic solvent and/or water. It is possible to use one or more of a broad variety of organic solvents. The organic solvent or solvents are selected according to the usual methods and with the usual considerations. In a preferred embodiment of the invention, the solvent is present in the coating composition in an amount of from about 0.01 weight percent to about 99 weight percent, preferably for organic solventborne compositions from about 5 weight percent to about 70 weight percent, and more preferably for topcoat compositions from about 10 weight percent to about 50 weight percent.

In another preferred embodiment, the solvent is water or a mixture of water with any of the typical co-solvents employed in aqueous dispersions. When the olefin-based block copolymer is to be used in a waterborne composition, it is advantageous to include in the block copolymer at least one polyethylene oxide segment to aid in dispersing the material. When modified with a polyethylene oxide segment, the block copolymer of the invention may be dispersed in water, optionally with other components (crosslinkers, additives, etc.) and then applied as an adhesion promoter or added to an aqueous coating composition as an aqueous dispersion of the block copolymer. Alternatively, the block copolymer may be blended with the film-forming polymer and then dispersed in water along with the film-forming polymer. In the latter method, it is contemplated that the block copolymer need not be modified with a hydrophilic segment, and instead the affinity of the block copolymer for the film forming vehicle can be relied upon to maintain the components in a stable dispersion.

Additional agents known in the art, for example and without limitation, surfactants, fillers, pigments, stabilizers, wetting agents, rheology control agents (also known as flow control agents), dispersing agents, adhesion promoters, UV absorbers, hindered amine light stabilizers, silicone additives and other surface active agents, etc., and combinations of these may be incorporated into the adhesion promoter or coating composition containing the olefin-based block copolymer.

The adhesion promoter and coating compositions can be coated on the article by any of a number of techniques well-known in the art. These include, without limitation, spray coating, dip coating, roll coating, curtain coating, and the like. Spray coating is preferred for automotive vehicles or other large parts.

The olefin-based block copolymer can be added to a topcoat coating composition in amounts that do not substantially change the gloss of the topcoat. In one application, for example, the olefin-based block copolymer is utilized in a topcoat composition, in particular a clearcoat composition which produces a high-gloss cured coating, preferably having a 20° gloss (ASTM D523-89) or a DOI (ASTM E430-91) of at least 80 that would be suitable for exterior automotive components. In another application, the olefin-based block copolymer may be added a topcoat composition that produces a low gloss coating, such as for coating certain automotive trim pieces. Typical low gloss coatings have a gloss of less than about 30 at a 60° angle.

When the coating composition of the invention is used as a high-gloss pigmented paint coating, the pigment may include any organic or inorganic compounds or colored materials, fillers, metallic or other inorganic flake materials such as mica or aluminum flake, and other materials of kind that the art normally names as pigments. Pigments are usually used in the composition in an amount of 0.2% to 200%, based on the total solid weight of binder components (i.e., a pigment-to-binder ratio of 0.02 to 2). As previously mentioned, adhesion promoters preferably include at least one conductive carbon black in an amount that makes the coating produced suitable for electrostatic applications of further coating layers.

The adhesion promoters and coating compositions can be applied at thicknesses that will produce dry film or cured film thicknesses typical of the art, such as from about 0.01 to about 5.0 mils. Typical thicknesses for adhesion promoter layers are from about 0.1 to about 0.5 mils, preferably from about 0.2 to about 0.3 mils. Typical thicknesses for primer layers are from about 0.5 to about 2.0 mils, preferably from about 0.7 to about 1.5 mils. Typical thicknesses for basecoat layers are from about 0.2 to about 2.0 mils, preferably from about 0.5 to about 1.5 mils. Typical thicknesses for clearcoat layers or one-layer topcoats are from about 0.5 to about 3.0 mils, preferably from about 1.5 to about 2.5 mils.

The adhesion promoters and coating compositions described herein are preferably thermally cured. Curing temperatures will vary depending on the particular blocking groups used in the cross-linking agents, however they generally range between 225° F. and 270° F. The curing temperature profile must be controlled to prevent warping or deformation of the TPO substrate or other plastic substrate. The first compounds according to the present invention are preferably reactive even at relatively low cure temperatures. Thus, in a preferred embodiment, the cure temperature is preferably between 230° F. and 270° F., and more preferably at temperatures no higher than about 250° F. The curing time will vary depending on the particular components used, and physical parameters such as the thickness of the layers, however, typical curing times range from 15 to 60 minutes, and preferably 20–35 minutes. The most preferred curing conditions depends upon the specific coating composition and substrate, and can be discovered by straightforward testing.

The coating compositions of the invention are particularly suited to coating olefinic substrates, including, without limitation, TPO substrates, polyethylene substrates, and polypropylene substrates. The coating compositions may also be used, however, to coat other thermoplastic and thermoset substrates, including, without limitation, polycarbonate, polyurethane, and flexible substrates like EPDM rubber or thermoplastic elastomers. Such substrates can be formed by any of the processes known in the art, for example, without limitation, injection molding and reaction injection molding, compression molding, extrusion, and thermoforming techniques.

The materials and processes of the invention can be used to form a wide variety of coated articles, including, without limitation, appliance parts, exterior automotive parts and trim pieces, and interior automotive parts and trim pieces.

The invention is further described in the following examples. The examples are merely illustrative and do not in any way limit the scope of the invention as described and claimed. All parts are parts by weight unless otherwise noted.

EXAMPLE 1

To a 3-liter flask, equipped with stirrer, condenser and nitrogen blanket, were added

| | |
|---|---|
| Shell Kraton Liquid Polymer L2203 | 787.0 grams |
| e-caprolactone | 137.7 grams |

-continued

| To a 3-liter flask, equipped with stirrer, condenser and nitrogen blanket, were added | |
|---|---|
| xylene | 380.8 grams |
| stannous octoate | 3.2 grams |

The mixture was heated to and maintained at 145 degrees C. for 2.5 hours. After cooling, the polymer was further reduced with 291.3 grams of xylene.

EXAMPLE 2

| To a 1-liter flask, equipped with stirrer, condenser and nitrogen blanket, were added | |
|---|---|
| Shell Kraton Liquid Polymer L2203 | 187.1 g |
| e-caprolactone | 29.8 g |
| xylene | 82.4 g |
| stannous octoate | 0.7 g |

The mixture was heated to and maintained at 145 degrees C. for 2.5 hours and cooled.

EXAMPLE 3 AND COMPARATIVE EXAMPLES A AND B

Coating compositions were prepared by adding the following components in order with mixing. Example 3 is a coating composition according to the invention. Comparative Example A is a coating composition without any adhesion additive. Comparative Example B is a coating composition containing an adhesion promoter according to the prior art. Amounts are given in grams of material.

| COMPONENT | EXAMPLE 3 | COMPARATIVE EXAMPLE A | COMPARATIVE EXAMPLE B |
|---|---|---|---|
| Resimene ® 755[1] | 25.0 | 25.0 | 25.0 |
| Acrylic Polyol[2] | 78.5 | 78.5 | 78.5 |
| Acrylic Microgel[3] | 55.3 | 55.3 | 55.3 |
| Xylene | 3 | 3 | 3 |
| Aromatic 100 | 11.2 | 11.2 | 11.2 |
| n-butyl Acetate | 20.0 | 20.0 | 20.0 |
| Copolymer of Example 2 | 38.8[5] | — | — |
| KRATON ® LIQUID L2203[4] | — | — | 43.1 |
| Xylene | 11.4 | — | — |

[1]Available from Monsanto Co., St. Louis, MO.
[2]hydroxyl functional, 75% nonvolatile by weight
[3]30.9% nonvolatile by weight
[4]25.0 grams of nonvolatile material, 58% in xylene, available from Shell Chemicals, Houston, TX
[5]24.2 grams of KRATON LIQUID L2203 block, 28.1 grams of nonvolatile material Results:

Each of the mixtures of Example 3 and Comparative Examples A and B were poured into clear test tubes, sealed, and aged for 10 days in an upright position without turning. At the end of 10 days, each mixture was observed to see if separate layers had formed. Comparative Example A had formed 2 separate layers, one layer being about 80% by volume. Comparative Example B had formed three layers, a first layer of about 40% by volume, a second layer of about 35% by volume, and a third layer of about 25% by volume. Example 3 had not separated into layers and instead remained homogeneous.

The results of the comparative testing demonstrate improved compatibility of the block copolymer with the organic components of a representative paint composition relative to unmodified olefinic diol and to the paint without the additive.

EXAMPLES 4–7 AND COMPARATIVE EXAMPLES C–F

Black Basecoat

A black basecoat composition was prepared having the following components:

| MATERIAL | PARTS BY WEIGHT |
|---|---|
| Resimene ® 755 | 11.31 |
| Acrylic Polyol (Non-volatile portion) | 28.05 |
| Acrylic Microgel | 5.88 |
| Pigment | 7.4 |
| Solvent | 45.3 |
| Additives | 2.0 |

The black basecoat composition was used to prepare Examples 4–7 and Comparative Examples C–F by mixing the following components. Parts are by weight.

| COMPONENT | EXAMPLE 4 | EXAMPLE 5 | EXAMPLE 6 | EXAMPLE 7 | COMP. EX. C | COMP. EX. D | COMP. EX. E | COMP. EX. F |
|---|---|---|---|---|---|---|---|---|
| Black Basecoat | 300 | 300 | 300 | 299.3 | 300 | 300 | 300 | 300 |
| KRATON LIQUID L2203[1] | 0 | 0 | 0 | 0 | 0 | 12.3 | 24.6 | 61.5 |
| Copolymer of Example 1 | 27.1 | 13.5 | 6.8 | 0.7 | 0 | 0 | 0 | 0 |
| n-butyl acetate | 8.0 | 4 | 2.0 | 5 | 0 | 7.5 | 10.8 | 12.0 |
| Xylene | 26.9 | 26.0 | 25.5 | 30.0 | 25 | 34.4 | 38.6 | 44.8 |

[1]58% in xylene, available from Shell Chemicals, Houston, TX

Results:

Each basecoat was applied directly over thermoplastic olefin substrate (Solvay D161B) and coated wet-on-wet with a commercial flexible 1K clearcoat. Panels were baked 30 minutes at 250° F. and a separate set of panels were baked 30 minutes at 265° F. Adhesion of the coating was characterized by observing the amount of paint removed by the Tape adhesion Test for Paint Finishes (General Motors Engineering Standard #GM9071P methods A and B. In method A the test specimen is scribed with a cross hatch and the % of paint which is removed by tape pull is recorded. In method B, a crosscut grid pattern is scribed onto the test specimen, and the % of paint which adheres following tape pull is recorded.

| BASE-COAT EXAMPLE | OLEFIN CONTENT (G L2203 SEGMENT/ 100 G VEHICLE OF UNMODIFIED BASECOAT) | METHOD A % PAINT LOSS @ 250 F. | METHOD B % PAINT ADHESION @ 250 F. | METHOD A % PAINT LOSS @ 265 F. | METHOD B % PAINT ADHESION @ 265 F. |
|---|---|---|---|---|---|
| 4 | 10 | 0 | 100 | 0 | 100 |
| 5 | 5.0 | 0 | 100 | 0 | 100 |
| 6 | 2.5 | 0 | 100 | 0 | 100 |
| 7 | 0.25 | 0 | 100 | Not tested | Not tested |
| C | 0 | 100 | 0 | 100 | 0 |
| D | 5 | 20% | 85 | 45 | 60 |
| E | 10 | 15% | 90 | 10 | 100 |
| F | 25 | 0 | 100 | 0 | 100 |

These examples illustrate that the compositions of the invention have excellent adhesion over olefinic-based substrates, even when the inventive block copolymer is included in amounts that are two orders of magnitude lower than the amounts required for previously known adhesion agent compounds for coating TPO.

The invention has been described in detail with reference to preferred embodiments thereof. It should be understood, however, that variations and modifications can be made within the spirit and scope of the invention and of the following claims.

What is claimed is:

1. A curable coating composition comprising the olefin-based block copolymer that is substantially saturated and at least one modifying block selected from the group consisting of (poly)ester blocks and (poly)ether blocks and at least one film-forming polymer.

2. A curable coating composition according to claim 1, wherein said block copolymer is from about 0.001% to about 4% by weight of the total weight of the nonvolatile vehicle.

3. A curable coating composition according to claim 1, wherein said block copolymer is from about 0.1% to about 10% by weight of the total weight of nonvolatile vehicle.

4. A curable coating composition according to claim 1, wherein said film-forming polymer is self-crosslinking and further wherein said olefin-based block copolymer comprises functional groups reactive with said film-forming polymer.

5. A curable coating composition according to claim 1, further comprising a crosslinker reactive with said film-forming polymer and said block copolymer.

6. A curable coating composition according to claim 5, wherein said film forming polymer is an acrylic polymer, and further wherein each of said acrylic polymer and said block copolymer has at least one functional group selected from hydroxyl groups, carbamate groups, urea groups, and combinations thereof.

7. A curable coating composition according to claim 6, wherein said crosslinker is a melamine formaldehyde resin.

8. A curable coating composition according to claim 1, wherein said curable coating composition is a topcoat composition.

9. A curable coating composition according to claim 1, wherein said curable coating composition is a basecoat composition.

10. A curable coating composition according to claim 1, wherein said curable coating is a clearcoat composition.

11. A curable coating composition according to claim 1, wherein said curable coating is a primer composition.

12. A curable coating composition according to claim 1, wherein said curable coating is a waterborne composition.

13. A curable coating composition according to claim 1, further comprising an organic solvent.

14. A method of coating an olefin-based substrate, comprising the steps of:
    (a) providing an adhesion promoter comprising and olefin-based block copolymer that is substantially saturated and at least one modifying block selected from the group consisting of (poly)ester blocks and (poly) ether blocks and at least one film-forming polymer;
    (b) applying the adhesion promoter to an olefin-based substrate;
    (c) applying a coating composition over the adhesion promoter; and heating the substrate having thereon the adhesion promoter and the coating composition to cure the coating composition.

15. A method according to claim 14, wherein the adhesion promoter further comprises a crosslinker.

16. A method according to claim 15, further comprising a step of curing the adhesion promoter before applying the coating composition of step (c).

17. A method according to claim 14, wherein said olefin-based substrate is a thermoplastic polyolefin (TPO).

18. A method of coating an olefin-based substrate, comprising steps of:
    (a) providing a curable coating composition according to claim 1;
    (b) applying the curable coating composition to an olefin based substrate; and
    (c) heating the substrate having thereon the curable coating composition to cure the coating composition.

19. A method according to claim 18, wherein the curable coating composition is a primer composition.

20. A method according to claim 18, wherein said curable coating composition is a topcoat composition.

21. A method according to claim 18, wherein said curable coating composition is a basecoat composition.

22. A method according to claim 18, wherein the curable coating is a clearcoat composition and further wherein the olefin-based substrate is a color-in-mold substrate.

23. A method according to claim 22, wherein the olefin-based substrate is a color-in-mold thermoplastic polyolefin (TPO) substrate.

24. An article comprising an olefin based substrate coated according to the method of claim 14.

25. An article comprising an olefin based substrate coated according to the method of claim 18.

26. An article according to claim 25, wherein the curable coating composition is a topcoat composition.

27. An article according to claim 25, wherein the curable coating composition is a basecoat composition.

28. An article according to claim 25, wherein the curable coating composition is a clearcoat composition and further wherein the olefin-based substrate is a color-in-mold substrate.

29. An article according to claim 25, wherein the olefin-based substrate is a color-in-mold thermoplastic polyolefin (TPO) substrate.

30. An article according to claim 25, wherein said article is selected from the group consisting of appliance parts, automotive parts, and automotive trim parts.

* * * * *